UNITED STATES PATENT OFFICE.

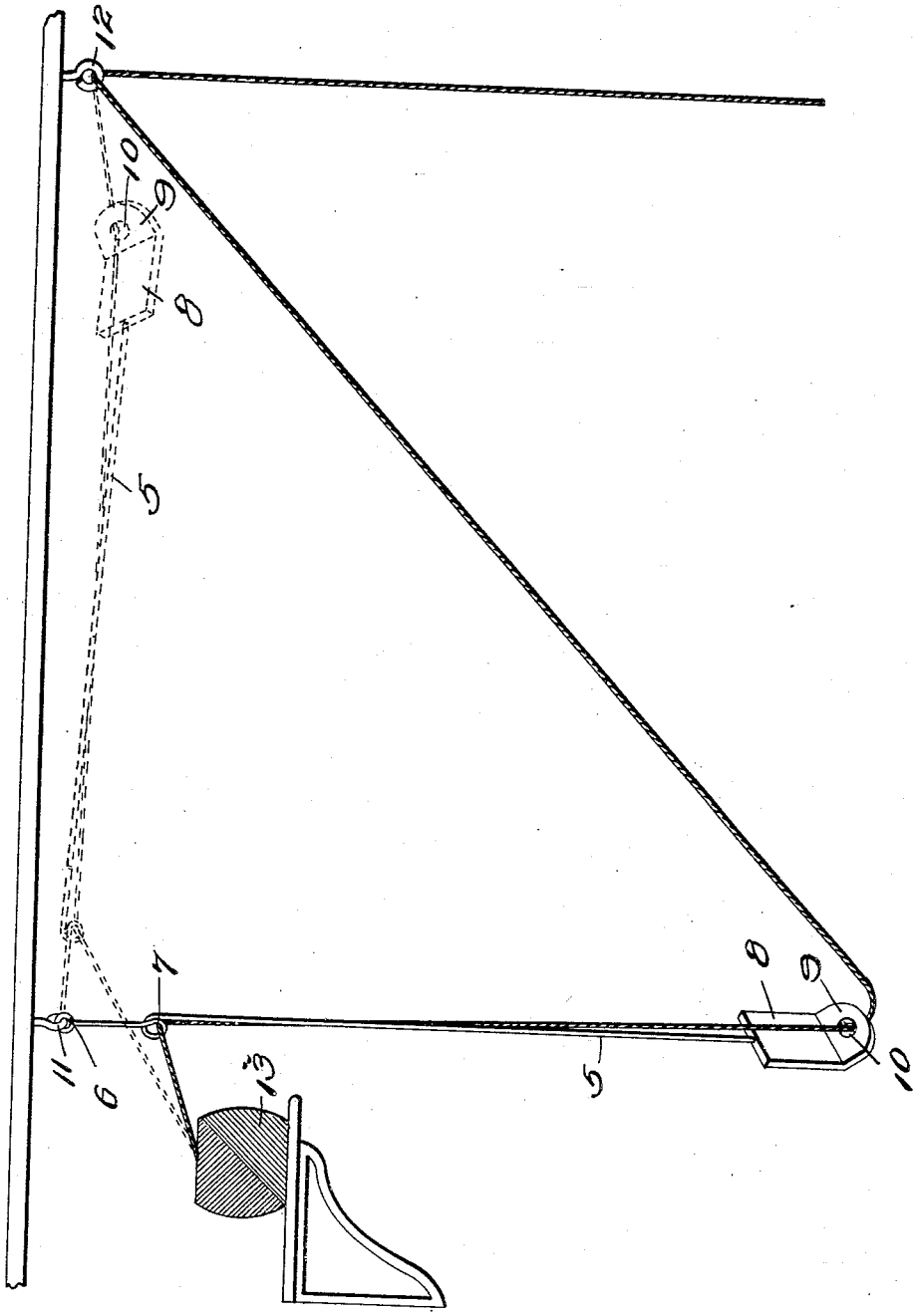

JOHN B. EASTMAN, OF SMETHPORT, PENNSYLVANIA.

TWINE TAKE-UP.

939,233.    Specification of Letters Patent.    Patented Nov. 9, 1909.

Application filed March 10, 1909. Serial No. 482,459.

*To all whom it may concern:*

Be it known that I, JOHN B. EASTMAN, a citizen of the United States, residing at Smethport, in the county of McKean and State of Pennsylvania, have invented certain new and useful Improvements in Twine Take-Ups, of which the following is a specification.

This invention relates to a twine take-up. The object of my invention is, to provide a simply constructed, inexpensive, readily operated take-up, to be used in connection with a ball of twine, to lift or take up the released end of a twine strand, to carry the same up and out of the way of the user, to be held however, where the twine end will be readily accessible.

With these and other objects in view the present invention consists of an arrangement of parts, as will be hereinafter more fully described, and particularly pointed out in the appended claim, it being understood that changes in the specific structures shown and described may be made within the scope of the claim without departing from the spirit of the invention.

In the drawing forming a part of this specification I have shown a perspective view of a twine take-up embodying my invention.

Store and shop keepers find it quite necessary to have the end of the tying twine readily accessible. At the same time the twine should not be where it will become entangled with the goods or purchases upon the counter, and in my present invention I provide a simply constructed twine take-up, in the form of a pendent freely swinging weighted stem, which is secured in a pendent position, and carries the tying twine in such a manner that when the twine is drawn or unwound from the ball, the pendent member will be carried substantially into a horizontal position, so that when the twine is released, the twine carrying member will draw up the released end of the twine to hold the end up and out of the way of the operator. The distance the twine end is carried up, depends on the length of the pendent twine carrier.

In the drawings the numeral 5, designates the stem carrier which is preferably of spring wire, and at its upper end is recurved, to provide the terminal eye 6. Near the upper or eye end, the carrier is provided with a coil 7, and at its lower end with the flat weight 8. This weight 8 has its lower end 9 extending obliquely downward, and is provided with a guide opening 10.

In connection with my twine carrier I employ two ordinary screw eyes 11 and 12 which are secured in the ceiling or are otherwise conveniently fastened and held in spaced relation, so that when the carrier is carried into a substantially horizontal position, the weighted end 9 will be held proximal to the twine guiding eye 12.

The supporting eye 11 to which the carrier is fastened is secured above the counter at a convenient point, the ball of twine which in the drawings is marked 13 is placed in a suitable receptacle or is otherwise held and has its end drawn or carried through the upper loop or coil 7, then through the opening within the offset end of the weight, and is then again carried upward through the securing guiding eye 12 and drawn down, so that the end will be within convenient reach of the user. When needed the twine is drawn down, in which operation the carrier 5 is carried into a substantially horizontal position. However as soon as the twine end is released the pendent carrier swings to its normal position, in which operation the free end of the twine is carried up and out of the way.

This construction provides a neat, inexpensive and convenient device, which can be used wherever twine is used for tying purposes. If desired the intermediately positioned coil or loop 7 may be eliminated and the twine be carried through the supporting screw eye 11.

The twine it will be noticed, is carried by two movable parts of the stem 5, the coil 7 and the weight 8. On dropping into its pendent position, the string forms a loop, between the ball 13 and the coil 7, preventing any cramping of the twine at the coil.

And having thus described my said invention what I claim as new and desire to secure by United States Patent is:

A twine take-up comprising the combination with a supporting eye, of a pendent wire stem having a terminal eye engaging said supporting eye, said stem near said terminal eye having a coil and at its lower end a flat weight having a portion extending obliquely downward with the guide opening therein, and a twine guiding screw eye in spaced relation to said supporting eye, a twine to be carried through said coil, weight opening and said guiding screw eye, as and for the purpose set forth.

In testimony whereof I affix my signature, in presence of two witnesses.

JOHN B. EASTMAN.

Witnesses:
J. W. BOUTON,
E. A. TULL.